(12) United States Patent
Rainer

(10) Patent No.: US 6,815,050 B2
(45) Date of Patent: Nov. 9, 2004

(54) POROUS COMPOSITE PRODUCT FOR THE ABSORPTION OF ORGANIC COMPOUNDS

(76) Inventor: Norman B. Rainer, 2008 Fondulac Rd., Richmond, VA (US) 23229

( * ) Notice: Subject to any disclaimer, the term of this patent is extended or adjusted under 35 U.S.C. 154(b) by 0 days.

(21) Appl. No.: 10/260,963

(22) Filed: Oct. 1, 2002

(65) Prior Publication Data

US 2003/0068484 A1 Apr. 10, 2003

Related U.S. Application Data

(63) Continuation-in-part of application No. 09/972,571, filed on Oct. 9, 2001, now Pat. No. 6,569,495.

(51) Int. Cl.[7] .............................. B32B 5/22; B01D 71/06
(52) U.S. Cl. ................. 428/317.9; 428/402; 428/308.4; 210/500.27; 210/500.42; 210/908; 210/909
(58) Field of Search ........................... 428/317.9, 315.7, 428/402, 308.4; 210/500.27, 500.42, 908, 909

(56) References Cited

U.S. PATENT DOCUMENTS 5,296,293 A  *  3/1994  Jobst ........................... 428/403
5,970,916 A  * 10/1999  Yoder et al. ................. 119/173
6,306,488 B1  10/2001  Rainer

OTHER PUBLICATIONS

A U.S. Sieve Series Table from Handbook of Chemistry, Lange, Fifth Edition.*

* cited by examiner

Primary Examiner—Terrel Morris
Assistant Examiner—Hai Vo
(74) Attorney, Agent, or Firm—Norman B. Rainer

(57) ABSTRACT

A product for the selective and rapid removal of toxic chlorocarbon compounds from fluid streams is provided in the form of a self supporting porous composite structure containing a multitude of water absorbent particles of cellulosic origin interbonded by hydrophilic microporous polyvinylchloride (PVC). A large number of the composite structures may be confined within a vessel adapted to receive a flow of fluid containing chlorocarbon compounds sought to be removed.

24 Claims, No Drawings

POROUS COMPOSITE PRODUCT FOR THE ABSORPTION OF ORGANIC COMPOUNDS

RELATED APPLICATIONS

This application is a continuation-in-part of U.S. patent application Ser. No. 09/972,571, filed Oct. 9, 2001 now U.S. Pat. No. 6,569,495.

BACKGROUND OF THE INVENTION

1. Field of the Invention

This invention relates to a product for the absorption of organic compounds, and more particularly concerns a porous composite material adapted to be employed as a stationary substrate which will remove organic compounds from a fluid stream flowing through said substrate.

2. Description of the Prior Art

In the field of pollution control, it is often sought to remove toxic organic substances from fluid streams such as air and water. The organic substances may be present in dissolved, suspended or vapor form, and may be present in large amounts, or in small amounts such as in parts per million, parts per billion, or less. Exemplary toxic organic species include: polychlorinated biphenyls, dioxins, polyaromatic hydrocarbons, nitroaromatics, pesticides, herbicides, methyl t-butyl ether, and volatile halocarbons.

Current technology for removing such organic contaminants involves the use of activated carbon. However, the activated carbon, generally in granular form, must be confined within a vessel as a bed through which the fluid to be treated is caused to flow. The bed of carbon granules generally creates impedance to water flow, requiring adequate pumping to achieve a sought flow rate. Also, suspended material in an ingoing water stream may accumulate within the bed to cause even higher flow impedance. Although activated carbon functions efficiently, its total capacity for absorbed species is low, often less than 2% of the weight of the carbon. This results in the need to handle large amounts of carbon for the removal of relatively small amounts of contaminants.

In certain water treatment situations, a high impedance to the flow of water through a stationary bed of absorbent material cannot be overcome merely by increasing pumping pressure. Such situations are generally encountered in passive, unattended or in-situ remediations of water which flows by gravity effect alone. Typical examples of such remediations include treatment of stormwater, landfill leachate, and end-of-pipe industrial and agricultural discharges.

In practical applications wherein trace components are removed from a flowing stream, it is desirable that the sought degree of removal be achieved with minimal requisite time of contact of the stream with the absorbent bed. When employing granular activated carbon to remove species from a water stream, contact times of over ten minutes are often required. Further shortcomings of the use of granular activated carbon are the lack of selectivity for toxic compounds, and handling difficulties in loading and unloading the carbon into absorption vessels. One factor in causing such handling difficulties is the relatively high bulk density of granular activated carbon.

U.S. Pat. No. 6,306,488, issued Oct. 23, 2001 describes the selective removal of dissolved chlorocarbons in a brief residence time and with low flow impedance using a composite porous structure comprised of hydrophilic microporous polyvinylchloride (PVC) deposited within cubes of cellulosic sponge. Although effective in use and easier to handle than granular materials, the cellulosic sponge component of said composite structure is relatively costly.

It is accordingly an object of the present invention to provide an absorbent product useful for the rapid removal of toxic species from a fluid stream.

It is another object of this invention to provide an absorbent product as in the foregoing object which can be employed as a stationary bed through which a fluid is caused to flow.

It is a further object of the present invention to provide an absorbent product of the aforesaid nature which, in bed form, presents minimal impedance to the flow of said fluid.

It is yet another object of this invention to provide an absorbent product of the aforesaid nature having a relatively low bulk density.

It is a still further object of the present invention to provide an absorbent product of the aforesaid nature which can exist as a self-supporting shaped structure.

It is an additional object of this invention to provide an absorbent product of the aforesaid nature amenable to low cost manufacture.

These objects and other objects and advantages of the invention will be apparent from the following description.

SUMMARY OF THE INVENTION

The above and other beneficial objects and advantages are accomplished in accordance with the present invention by a self supporting porous composite structure having absorptive affinity for chlorocarbon compounds in fluid streams and comprised of a multitude of water absorbent particles of cellulosic origin interbonded by hydrophilic microporous PVC. In a preferred embodiment, the invention is comprised of a multitude of said structures useful as a bed through which a fluid is caused to flow with low impedance.

DESCRIPTION OF THE PREFERRED EMBODIMENT

Preferred water absorbent particulate material of cellulosic origin useful in producing the absorbent product of this invention include shredded newspapers, agricultural waste such as peanut shells, shredded corn husks, tobacco stems and wood bark, peat moss and composted leaf material. In general, the particulate material should have an average size greater than one millimeter. Suitable materials are best prepared by drying, comminuting, as by grinding, shredding or chopping, followed by sieving.

The water content of the particulate material is preferably not significantly greater than an equilibrium moisture content at 75° F. and 75% relative humidity, such moisture content generally being less than about 15%. The dry particulate material may be subjected to a sieving operation for the primary purpose of removing fines, namely particles having a size below about a millimeter. The sieving operation may also remove particles larger than a particular size so that the resultant sieved material will be reasonably homogenous. The preferred degree of homogeneity is such that the sieved material will not be readily susceptible to gravitational fractionation into separate fine and coarse layers. It has been found that such separation is minimized when there is less than a five-fold spread in the average size of the particles. Said spread in average particle size may be referred to as a heterogeneity factor.

A particularly desirable product of cellulosic origin useful in producing the absorbent product of this invention is dried Sphagnum peat moss (class: Bryopsida; genus: Sphagnum). Such product, an export of Canada, is commercially available under the Hyponox brand. The peat moss is preferably sieved through a #6 screen (U.S. Sieve Series), having a sieve opening of 3.36 mm., and captured on a #12 screen, having a sieve opening of 1.68 mm. The resultant sieved fraction accordingly has a heterogeneity factor of 3.36 divided by 1.68=2. Suitable heterogeneity factors for the particles useful in this invention preferably range from 1 to 4.

The expression "macroporous," as employed herein, is intended to denote a structure having sufficient large pores of greater than 0.5 mm. diameter as to cause most of the pore volume of the structure to reside in said large pores. In general, the total pore volume of the absorbent product of this invention in a shaped structure form is between about 60% and 92% of the outer geometric volume of the shaped form. Pore volumes and size distribution may be determined employing a mercury intrusion penetrometer and a helium pyknometer. A simplifying consideration in such analyses is the assumption that the specific gravity of both the PVC and particles of cellulosic origin is 1.4.

The self supporting nature of the product of the present invention is such that the product will have a compressive strength or modulus, in wet state, of between 2 and 12 p.s.i. at 10% deformation. The product is preferably in the form of shaped structures as may be produced for example by extrusion techniques, molding or cutting and shaping methods. In use, a great multitude of the shaped structures are deployed within a confining vessel as a bed through which a fluid such as water or air is caused to flow. The expression "water absorbent," as employed herein to characterize the particles of cellulosic origin, defines substances which are wetted by water and further absorb water by way of incorporation at the molecular level and by way of a capillary action wicking effect.

The microporous PVC is produced substantially by the procedure of U.S. Pat. No. 3,674,722, said procedure involving forming a mixture of a colloidal dispersion of a latex of a non-film forming PVC with a water-soluble organic non-solvent for the polymer, and subjecting the mixture to thermal curing. A preferred non-film forming PVC latex useful in the practice of this invention is Vycar 351, produced by the B. F. Goodrich Company. Preferred water-soluble organic non-solvents include glycols of low volatility, a preferable species being glycerine. Suitable low volatility non-solvents are liquids having a boiling point at atmosphere pressure of greater than 220 degrees F.

The latex may be mixed with the non-solvent liquid by conventional techniques, low shear methods being preferable. It is preferred to add the non-solvent liquid slowly to the latex, rather than to add the latex to the non-solvent liquid. From 0.4 to 5 parts, by weight, of the non-solvent are preferably employed for each part of polymer contained in the latex. The mixture of latex and non-solvent liquid is essentially a colloidal dispersion of the polymer particles in the non-solvent liquid containing water derived from the latex. Mixtures containing the lower ranges of polymer content produce microporous PVC having higher pore volume, larger average pore size, and lower structural strength, by comparison with microporous PVC substrates produced from dispersions of higher polymer content.

To produce the composite porous structures of the present invention, the latex/non-solvent mixture dispersion is combined with the water absorbent particles in dry form, whereby the particles absorb the mixture to form a wet mass. The expression "dry" as employed herein to describe the particles is intended to denote a moisture content of less than 15%. The amount of dispersion mixture employed is such as to be just short of producing substantial gravity-induced run-off of the mixture from the wet mass.

The wet mass is then subjected to heat treatment at temperatures in the range of 220 degrees F. to 300 degrees F. for periods of from about 150 to 10 minutes, respectively. The effect of the heat treatment is to cause the dispersed polymer particles to cohere or sinter together, thereby forming a microporous substrate structure within and between the particles. Greater degrees of sintering, produced by the more severe heating conditions, provide structures having reduced pore volume, smaller average pore size, and greater strength. If the heat treatment is insufficient, the microporous PVC will have too little strength to be retained within the structure. In one manner of heat treatment, the mass is initially subjected to low temperature heating to remove water, then subjected to a second stage of heating at an elevated temperature to "cure" the PVC, namely to achieve sintering of the PVC so as to produce a microporous substrate. Such initial stage of heating may utilize microwave heating, which has been found to expand particles having cellular content.

In order to produce composite porous structures that can effectively absorb significant amounts of organics from water while retaining acceptable porosity and retention of the microporous PVC substrate, it has been found that the weight ratio of PVC/particles should range between 1/1 and 5/1, thereby producing structures comprised of between 50% and 83% PVC, respectively. Lower weight ratios result in composite porous structures having little absorptive capacity for organics. Higher weight ratios result in composite structures of reduced porosity with attendant diminished ability to allow passage of water requiring remediation.

The microporous PVC is a sintered substrate comprised of a multitudinous random array of interconnecting capillaries or interstices whose walls are composed of cohered particles of polymer which, under electron microscopic examination are seen to substantially retain their individual identities. The effect of the sintering step, therefore, is to cause the polymer particles to interadhere at their points of contact, as opposed to causing complete melting of the particles to a molten form with loss of particle identity and consequent reduced surface area. The average diameter of the pores or interstices may range from about 0.2 micron to 20 microns. The pore volume of the microporous PVC substrate may range from 0.4 cc/gram for strongly sintered structures to 4.5 cc/gram for lightly sintered structures.

The surface area of the microporous PVC will range from about 0.4 square meters/gram to about 10 square meters/gram. It may be noted in this connection that the total theoretical surface area of the colloidally dispersed PVC particles of a polymer latex is considered to be about 15 square meters/gram. The microporous PVC substrate produced by the process of this invention therefore retains between about 5 percent and 60 percent of the surface area of the colloidal particles. This is essentially a measure of the degree of coherence of the sintered microporous substrate, and its relatively large surface area is a consequence of the retention of individual identity of said colloidal particles. The morphological characteristics of the microporous PVC substrate can best be measured by producing the substrate as a monolithic molded or cast structure in the absence of the cellulosic particles, but under the same conditions of dispersion dilution and thermal curing as would be employed in producing a composite macroporous absorbent structure. Such monolithic structure is also useful in demonstrating the hydrophilic nature of the PVC substrate. In particular, a drop of water placed on such structure will show a zero contact angle. By way of contrast, a drop of water placed upon a conventional PVC film will show a very high contact angle.

It is to be emphasized that the composite structure of this invention has three elements of porosity, namely: a) the porosity of the individual particles of cellulosic origin, such porosity being either of a cellular nature as may exist with peat moss and tobacco stems, or capillary interaction in papers; b) the porosity of the microporous PVC substrate; and c) the interstitial space between particles, said interstitial space being potentially the largest volume component of the structure and having the largest sized pores.

It is to be noted that the aforesaid procedure for producing the composite absorbent of this invention differs from the procedure in U.S. Pat. No. 3,674,722 in that the water component of the dispersion mixture is not removed in a separate dehydration step prior to thermal curing. Instead, the water absorbent particles employed in producing the product of this invention selectively remove the water from the dispersion mixture, thereby obviating the otherwise necessary dehydration of the wet mass prior to the curing step. This is an unexpectedly advantageous feature of employing water absorbent particles instead of other, non-water absorbing particles.

The microporous PVC substrate may be made to contain certain additives either by way of incorporation into the dispersion, or by aftertreatment subsequent to sintering. Such additives include fine clays; other polymers in latex or powder form such as polyvinyl acetate; polystyrene, and other addition and condensation polymers; activated charcoal; graphite; carbon black; powdered metals; catalysts; pigments; stabilizers; plasticizers; bacteriostats; odorants; functional water-insoluble organic compounds; and other species. A particularly preferred additive is sub-micron sized positively charged particles, such as "Alon" alumina aerogel, a product of the Cabot Corporation. Additives, when employed, usually will be present in an amount from about 0.3 percent to about 20 percent by weight of the PVC. Certain additives may be employed which, in conjunction with the fine pore structure of the PVC substrate cause the composite structure to be useful in retaining microbial organisms useful in the bioremediation of polluted water.

The organic liquid may be removed from the thermally cured composite structure by washing with water or by evaporation at reduced pressure, thereby facilitating recovery and re-use of said liquid. Alternatively, however, the cured product may be sold and used with the contained liquid. With initial use of the composite porous structure in a water-treating operation, said liquid will be removed. Liquids such as glycerine are biodegradable and environmentally benign.

Although the utility of the composite porous structure of this invention has been described with respect to the treatment of fluids such as air and water, other uses for the structure exist as, for example, sound absorption and thermal insulation.

The following examples present illustrative but non-limiting embodiments of the present invention. All parts and percentages are by weight unless otherwise noted.

EXAMPLE 1

Some newspapers were shredded on a commercially available shredding machine to produce elongated pieces of newspaper of about ¼" width. The shredded material was randomized. A weighed amount of the shredded material was then sprayed to saturation with a dispersion having been produced by mixing 4.8 parts of anhydrous glycerine with 8.0 parts of Vycar 351 PVC latex having 58% solids content. Excess dispersion was allowed to drain off. The mass of impregnated shreds was re-weighed, then compacted to a ¾" thick layer in a teflon-coated aluminum tray of 8 inch circular diameter.

The tray containing the compacted mass was placed in an oven at 275° F. for 100 minutes. The mass was then washed with water while still in the tray, then removed as an integral self-supporting panel which is reasonably rigid, even in water-wet state. The compressive strength of the panel, in wet form is measured to be 2.8 pounds/square inch. The panel demonstrates extremely low impedance to the flow of water when held under a faucet emitting a rapid stream of water. Upon drying, the calculated add-on weight of PVC was found to be 1.01×.

For testing purposes, the panel was immersed in a large vessel containing water. Measured amounts of trichloroethylene (TCE), a pervasive pollutant, were added to the vessel, and the vessel was sealed and subjected to shaking action. It was found that the panel could absorb an amount of TCE equal to 22% of the dry weight of the panel.

Such capabilities enable the panel to be well suited for the in-situ removal of pollutants from groundwater. In particular, the panel would be emplaced within a trench or conduit that intercepts groundwater, and would be removed after a period of days or weeks with its captured organic pollutant.

EXAMPLE 2

Some Canadian Sphagnum peat moss was sieved to produce a 6/12 sieve fraction, namely material which passes through a number 6 sieve and is retained on a number 12 screen (U.S. Screen Series). The sieved material, having a moisture content of 9.5%, was then spray treated with a dispersion comprised of 4 parts anhydrous glycerine and 8 parts Vycar 351 PVC latex. Sufficient dispersion was added to produce a flowable thick wet mass having minimal immediate run off of dispersion.

The wet mass was then advanced by means of a screw auger through an elongated perforated plastic nozzle extending through a microwave oven and terminating in an exit orifice of one inch diameter. As the mass enters the oven it undergoes extremely rapid heating with evolution of water and attendant expansion of the peat moss particles. Upon exiting the oven, a continuous rod-like extrudate is produced having sufficient physical integrity to permit handling.

Lengths of the rod are transferred to an oven maintained at 245° F. After a residence time of 1 hour and 45 minutes, the rods are removed and immersed in a trough for washing with a flow of water. The washed rods are cut into one inch lengths to produce drum-shaped pellets having a wet compressive modulus of 3.1 pounds per square inch at 10% compaction, a PVC content of 67%, and a total pore volume which is 82% of outer geometric volume.

A large quantity of said pellets are loaded into an elongated fishnet bag capable of lateral expansion, and the bag of pellets is entered into a vertical column of 8" I.D. and 5' height, valved at the bottom. In a separate 200 gallon holding tank, a test water solution is prepared by diluting to 1 ppm calibration mixture TCLP-IVM procured from Chem Service of West Chester, Pa. Said test solution is pumped upwardly through the column at flow rates adequate to produce residence times in the column of 1.9 minutes and 8.3 minutes in first and second separate experiments, respectively. The flow impedance is measured at 1.8 p.s.i. in said first experiment, and 1.2 p.s.i. in said second experiment. In general, the flow impedance is found to be less than 0.4 p.s.i. per foot of bed depth at a flow of 10 gallons per minute per sq. ft. of bed cross section. Such impedance is considerably less than what would be expected using granular carbon of 20/50 mesh under comparable conditions. The effluent water from the column was analyzed by way of EPA method 524.2. Results are presented in Table I.

TABLE I

| COMPOUND | % REMOVAL | |
|---|---|---|
|  | (1.9 mins) | (8.3 mins) |
| Carbon tetrachloride | 49.5 | 100 |
| Chlorobenzene | 49.0 | 100 |
| Chloroform | 31.5 | 98.3 |
| 1,4-Dichlorobenzene | 67.0 | 100 |
| 1,2-Dichloroethane | 28.7 | 99.8 |
| 1,1-Dichloroethane | 66.7 | 100 |
| Tetrachloroethene | 69.2 | 100 |
| Trichloroethene | 63.5 | 100 |
| Vinyl chloride | 61.5 | 100 |

As the data of Table I indicate, the PVC exhibits very high affinity for volatile chlorocarbon compounds, and the efficiency of removal varies directly with contact time.

EXAMPLE 3

Some burly tobacco stems were water-extracted, crushed, dried and then sieved to produce a 4/10 sieved material (U.S. Screen Series). The sieved particles were immersed in the dispersion employed in Example 1 at 40° C. with vacuum deaeration. The impregnated material was then dried by passage through a microwave oven, a procedure which rapidly removes most of the water with attendant expansion of the particles. The emergent particles, still containing the glycerine and PVC components of the dispersion, were shaped into rounded brickettes of 1½" diameter with convex faces. The brickettes were cured in an oven at 250° F. for one hour, then washed with water to recover the glycerine. The resultant brickettes contain 73% PVC and have a total pore volume which is 77% of the outer geometrical volume of the brickette.

The brickettes were loaded into an elongated fishnet bag capable of lateral expansion, and the bag was entered into a column as employed in Example 2. A test water solution was prepared by mixing and diluting Chem Service pesticide and polychlorinated biphenyl (PCB) mixtures OCP508 and PCB525, respectively, to 1 ppm concentration. Kerosine was added at a 1 ppm concentration. The test solution was pumped upwardly through the column at a rate to provide a residence time of 5.8 minutes in contact with the bed of brickettes. The measured impedance to flow is 1.5 p.s.i. The effluent was analyzed by the EPA test method 608. Results are presented in Table II.

TABLE II

| COMPOUND | % REMOVAL |
|---|---|
| 4,4' DDD | 100 |
| 4,4' DDE | 100 |
| 4,4' DDT | 100 |

TABLE II-continued

| COMPOUND | % REMOVAL |
|---|---|
| Aldrin | 97 |
| Aroclor 1016 | 100 |
| Aroclor 1221 | 100 |
| Aroclor 1232 | 100 |
| Aroclor 1242 | 100 |
| Aroclor 1248 | 100 |
| Aroclor 1254 | 100 |
| Aroclor 1260 | 100 |
| Chlordane | 100 |
| Dieldrin | 100 |
| Endosulfan I | 97 |
| Endosulfan II | 100 |
| Endosulfan sulfate | 100 |
| Endrin | 95 |
| Endrin aldehyde | 92 |
| Heptachlor | 97 |
| Heptachlor Epoxide | 96 |
| Methoxychlor | 100 |
| alpha-BHC | 84 |
| beta-BHC | 78 |
| delta-BHC | 95 |
| gamma-BHC (Lindane) | 82 |
| kerosine | 12 |

As the results of Table II indicate, the absorbent product of this invention, in the form of a shaped structure employed in a multitude as a stationary bed, is capable of selectively removing toxic chlorocarbons while substantially ignoring commonly occurring innocuous hydrocarbons such as kerosine.

Compliant mesh bags filled with the brickettes of Example 3 or the pellets of Example 2, or other shaped structure variations of the absorbent product of this invention may be emplaced within conduits that receive stormwater, landfill leachate, or agricultural run-off. The deformable nature of compliant fishnet containers enables the absorbent structures to form a bed which occupies the entire conduit, thereby preventing by-pass of water around the bed. The low flow impedance of the bed allows in-situ use where the water stream flows by gravity effect alone. The bed of absorbent confined within the mesh bag is easily installed into and removed from its position of functional emplacement. Suitable mesh bags are fabricated of strong nylon or polyester fiber in a diamond shaped fishnet construction having apertures of between ¼" and 1" size. The construction of the bag permits sufficient lateral and longitudinal expansion as to conform to most enclosures.

EXAMPLE 4

A mixture of 50% peanut shells and 50% corn cobs in dry pulverized form was sieved to obtain a 3/10 sieved fraction, having a minimal particle size of 2 mm. and heterogeneity factor of 3.3. Said sieved fraction was divided into two halves.

The first half, in a first test, was immersed in the dispersion of Example 1 at 40° C. with vacuum deaeration. The resultant wet mass was converted into pellets by the procedure of Example 2.

The second half, in a second test, was immersed into a dispersion similar to that employed for treating the first half, but wherein the Vycar 351 latex was replaced with a conventional film-forming latex, namely Vycar 227. The resultant wet mass was converted into pellets of the same size and shape as in the first test.

The pellets of said first and second tests were loaded into separate columns of the same nature employed in Example 2, and were treated in the manner of Example 2 with the same test solution, employing a residence time of 3.7 minutes. Similarly, in a third test, the sieved particles alone, without PVC addition, were loaded into a third column. The effluent water from each column was analyzed employing the same procedure as in Example 2. Results are presented in Table III.

TABLE III

| COMPOUND | % REMOVAL | | |
|---|---|---|---|
| | First Test | Second Test | Third Test |
| Carbon tetrachloride | 63 | 9 | 0 |
| Chlorobenzene | 72 | 8 | 5 |
| Chloroform | 48 | 5 | 0 |
| 1,4-Dichlorobenzene | 79 | 11 | 3 |
| 1,2-Dichloroethane | 47 | 9 | 2 |
| 1,1-Dichloroethane | 79 | 13 | 4 |
| Tetrachloroethene | 86 | 11 | 4 |
| Trichloroethene | 91 | 7 | 0 |
| Vinyl chloride | 82 | 8 | 1 |

The data of Table III indicate that, even though the pellets of the second test contained PVC, the PVC was not in a microporous or hydrophilic state, and they consequently performed very poorly in removing the chlorocarbon compounds. The water absorbent particles of the third test, devoid of PVC in any form, absorbed little, if any of the chlorocarbons.

The expression "of cellulosic origin", as employed herein, is intended to define products derived from plants, and which still contain cellulose that originated in cell walls of the plant. One of the specifically exemplified embodiments is paper having been made from wood pulp, and which may have a cellulose content in the range of 70%–95%. Other suitable materials, such as peat moss, tobacco stems, and agricultural wastes contain lesser amounts of cellulose. However, in order to be effective in the practice of this invention, the interbonded particles should contain at least 20% cellulose, and should be capable of absorbing at least 12% water when equilibrated to air at 65% R.H. and 20° C.

A particularly useful particulate material, having a relatively low cellulose content, is organic mulch generated from shredded trees and leaves. Such material has been found capable of destroying chlorocarbons such as trichloroethylene by way of a dehalogenation mechanism. Although said dehalogenation is a very slow reaction, its effectiveness is enhanced by the fast-acting function of the microporous PVC in absorbing and thereby concentrating chlorocarbons in close adjacency to the mulch particles. The cellulose content of a particular material can be assayed by standard chemical and instrumental methods.

The porous composite product of this invention may also be fabricated as a shaped structure having a size and shape such as to be useful as an integral block which can be fitted as a unitary body into a conduit adapted to receive a fluid flow, said fit being such as to prevent significant bypass of said fluid. Such integral blocks may, for example, have a disc-like or cylindrical configuration having a circular perimeter adapted to make a close fit with the interior wall of a pipe. In such manner of use, the block may be dropped or pushed into an appropriate pipe which conveys a water or gas stream undergoing remediation by said block. In yet another application, a number of said integral blocks may be interconnected by tether means such as a rope, and such assemblage may be laid into river sediment for long term immersion for the purpose of removing polychlorinated biphenyls (PCB) from the sediment.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A self supporting porous composite structure having absorptive affinity for chlorocarbon compounds in fluid streams and comprising a multitude of water absorbent porous particles of cellulosic origin interbonded by hydrophilic microporous PVC, said particles having a size greater than 1 mm and creating unoccupied interstitial space relative to adjacent particles, said structure containing between 50% and 83% by weight of PVC.

2. A bed comprising a vessel and a large number of the composite structures of claim 1 that is confined within the vessel adapted to receive a flow of fluid.

3. The bed of claim 2 wherein the composite structures have substantially identical outer shape.

4. The bed of claim 2 comprising a compliant open mesh bag having apertures between ¼ inch and one inch in size, wherein the bed is contained within the compliant open mesh bag.

5. The bed of claim 2 having a flow impedance of less than 0.4 p.s.i. per foot of bed depth at a flow of 10 gallons per minute per square foot of bed cross section.

6. The composite structure of claim 1 wherein the size heterogeneity factor of said particles is between 1 and 4.

7. The composite structure of claim 1 comprising a weight ratio of PVC/particles of between 1/1 and 5/1.

8. The composite structure of claim 1 having a pore volume which is between 60% and 92% of the outer geometrical envelope volume of the composite structure.

9. The composite structure of claim 1 having a compressive wet modulus between 2 and 12 p.s.i. at 10% deformation.

10. The composite structure of claim 1 wherein said microporous PVC has a pore volume in the range of 0.4 to 4.5 cc/gram.

11. The composite structure of claim 1 wherein the surface area of said microporous PVC is between 0.4 and 10 square meters/gram.

12. The composite structure of claim 1 wherein the microporous PVC has a zero wetting angle for water.

13. The composite structure of claim 1 wherein the microporous PVC has pores whose diameters range from 0.2 to 20 microns.

14. The composite structure of claim 1 wherein said particles are capable of absorbing water by way of capillary action wicking effect.

15. The composite structure of claim 14 wherein said porous particles also absorb water at the molecular level.

16. The composite structure of claim 1 further containing glycerine.

17. The composite structure of claim 1 wherein said particles contain at least 20% cellulose.

18. The composite structure of claim 17 wherein said particles are agricultural waste.

19. The composite structure of claim 1 having the ability to absorb significant quantities of chlorocarbon compounds within a contact duration of less than 10 minutes.

20. The composite structure of claim 1 having three elements of porosity: a) the porosity of the individual particles of cellulosic origin, b) the porosity of the microporous PVC, and c) the interstitial space between said particles.

21. The composite structure of claim 1 wherein said water absorbent particles are shredded paper.

22. The composite structure of claim 1 wherein said water absorbent particles are peat moss.

23. The composite structure of claim 1 wherein said water absorbent particles are tobacco stem.

24. A bed comprising a fluid-conveying conduit and the composite structure of claim 1 in the form of a shaped integral block that is configured to fit within the fluid-conveying conduit in a manner to prevent substantial by-pass of said fluid.

* * * * *